United States Patent [19]

Souma

[11] Patent Number: 5,200,944
[45] Date of Patent: Apr. 6, 1993

[54] DISC PLAYBACK APPARATUS FOR REPRODUCING SEQUENTIALLY RECORDED DIGITAL DATA

[75] Inventor: Yasuhito Souma, Moriguchi, Japan

[73] Assignee: Matsushita Electric Industrial Co., Ltd., Osaka, Japan

[21] Appl. No.: 686,389

[22] Filed: Apr. 17, 1991

[30] Foreign Application Priority Data

Apr. 18, 1990 [JP] Japan .................................. 2-101924

[51] Int. Cl.⁵ ............................................. G11B 20/10
[52] U.S. Cl. ........................................ 369/48; 369/50; 369/59; 369/124
[58] Field of Search ............... 369/50, 32, 58, 59, 369/44.34, 44.28, 115, 124, 47, 48; 358/342, 907, 343, 338, 341; 360/73.01, 73.08, 73.05, 73.03, 78.04, 78.06, 78.08, 79, 75, 8, 9.1, 10.1

[56] References Cited

U.S. PATENT DOCUMENTS

| | | | |
|---|---|---|---|
| 4,829,497 | 5/1989 | Sako et al. | 369/50 |
| 4,845,572 | 7/1989 | Yasuda | 360/10.1 |
| 4,847,697 | 7/1989 | Tobe | 360/10.1 |
| 4,870,509 | 9/1989 | Nagasawa et al. | 360/9.1 |
| 4,896,221 | 1/1990 | Mashimo | 358/342 |

*Primary Examiner*—Wayne R. Young
*Attorney, Agent, or Firm*—Wenderoth, Lind & Ponack

[57] ABSTRACT

A disc playback apparatus for reproducing data from a disc having digital data including at least image data or computer data recorded sequentially thereon includes: a spindle motor for rotating the disc; a pick-up assembly for reading and outputting data from the disc, as an electrical signal; waveshaping circuit for shaping the electrical signal into a pulse signal; a clock extracting circuit for extracting a playback clock signal from the pulse signal; a reference clock generating circuit controlled by a reference clock control circuit, for continuously varying and outputting a frequency of the reference clock signal; and a switching circuit which is switched on and off, the reference clock control circuit increasing the frequency of the reference clock signal when the switching circuit is switched on, and decreasing it when the switching circuit is switched off; a rotation servo circuit for controlling the spindle motor so that the frequency of the playback clock signal is consistent with the frequency of the reference clock signal; a digital signal processing circuit for receiving the pulse, playback clock and reference clock signals and for latching data from the pulse signal on the basis of the playback clock signal, and for processing and outputting the latched data according to the reference clock signal; and a processing and outputting circuit for receiving data outputted from the digital signal processing circuit and for processing and outputting attributes of the data.

6 Claims, 8 Drawing Sheets

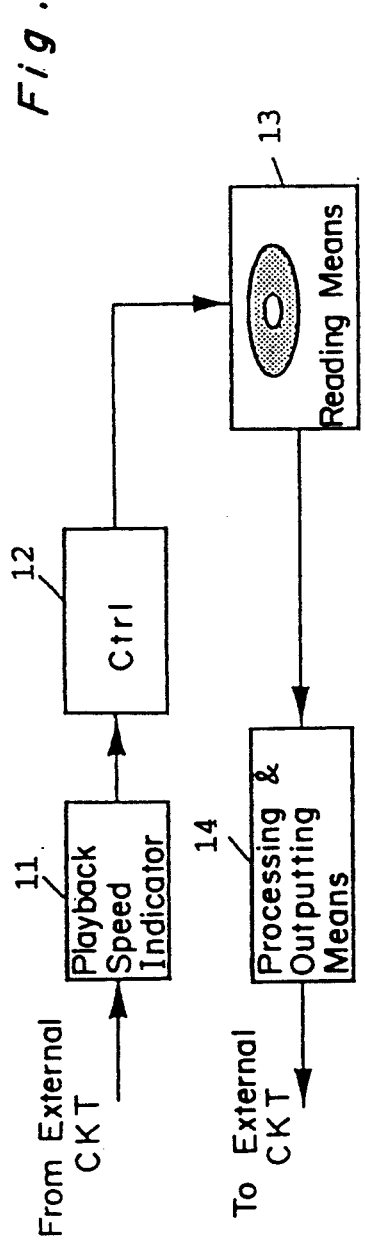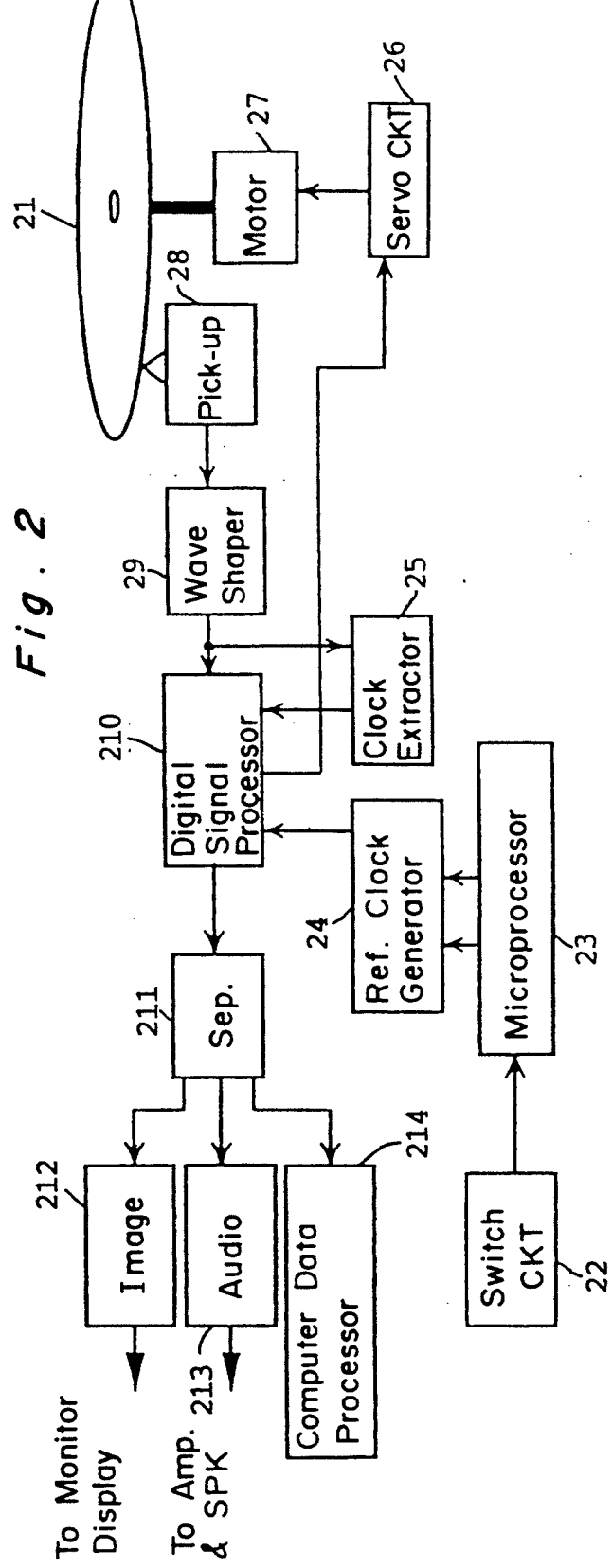

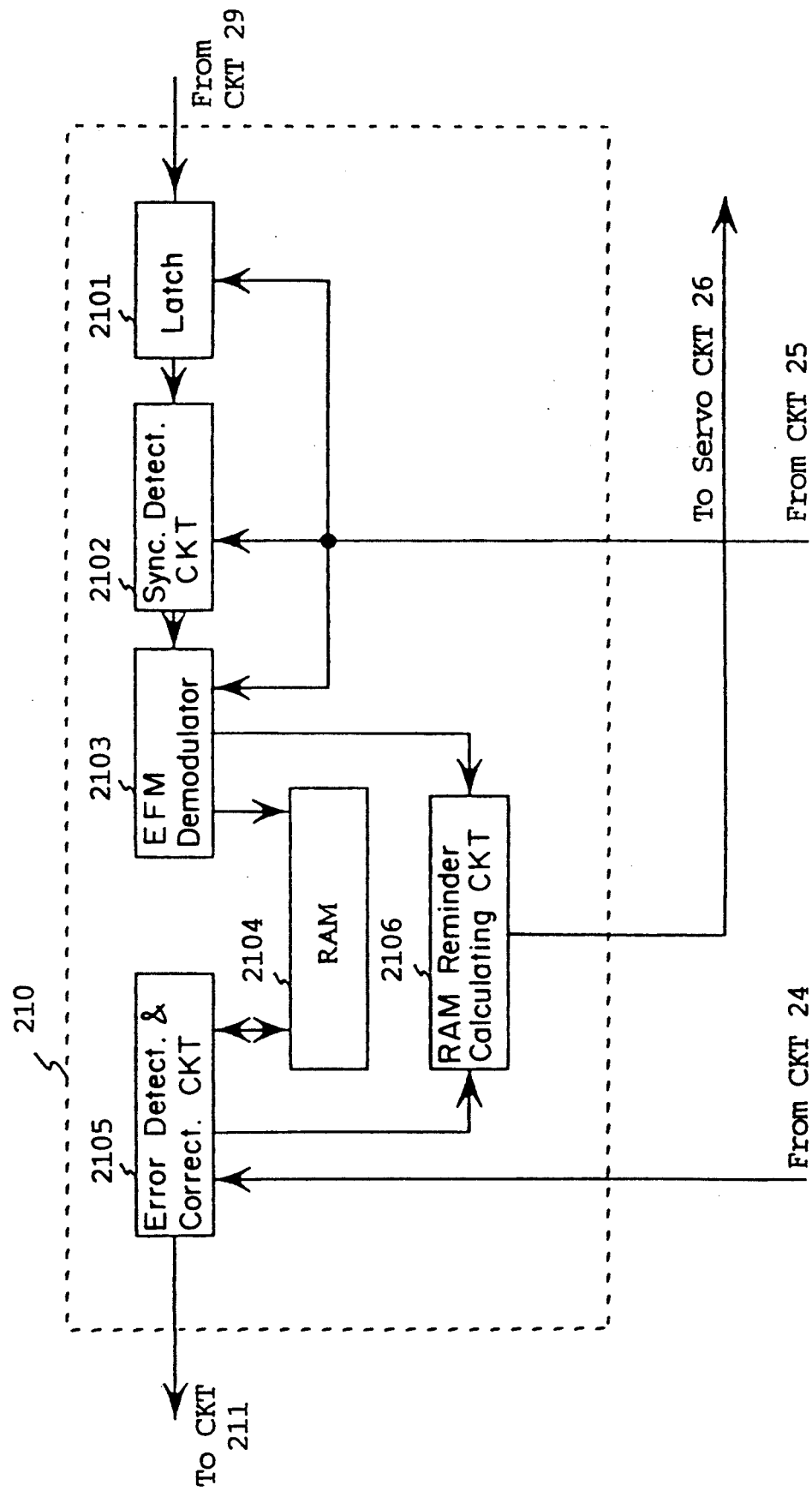

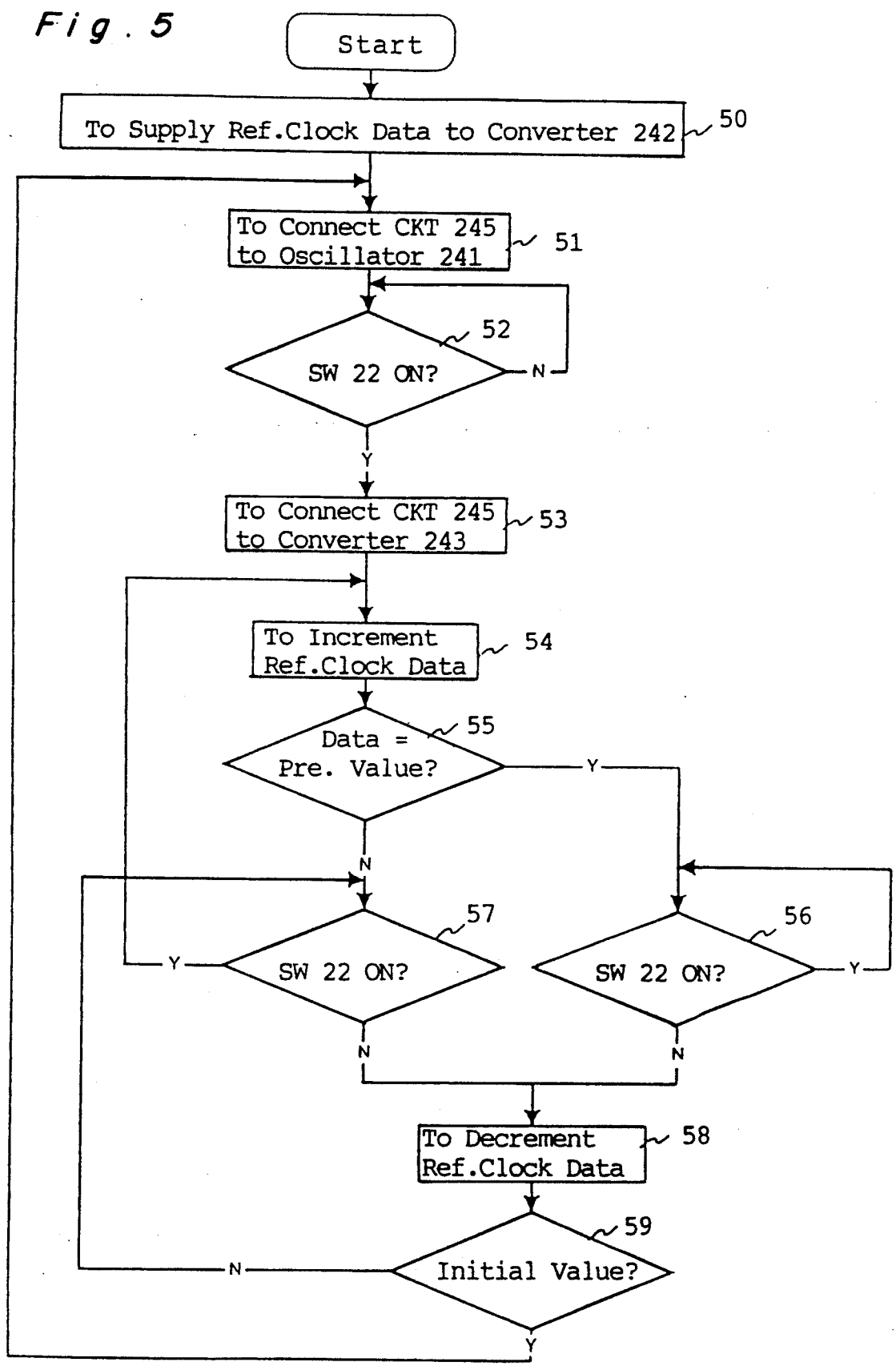

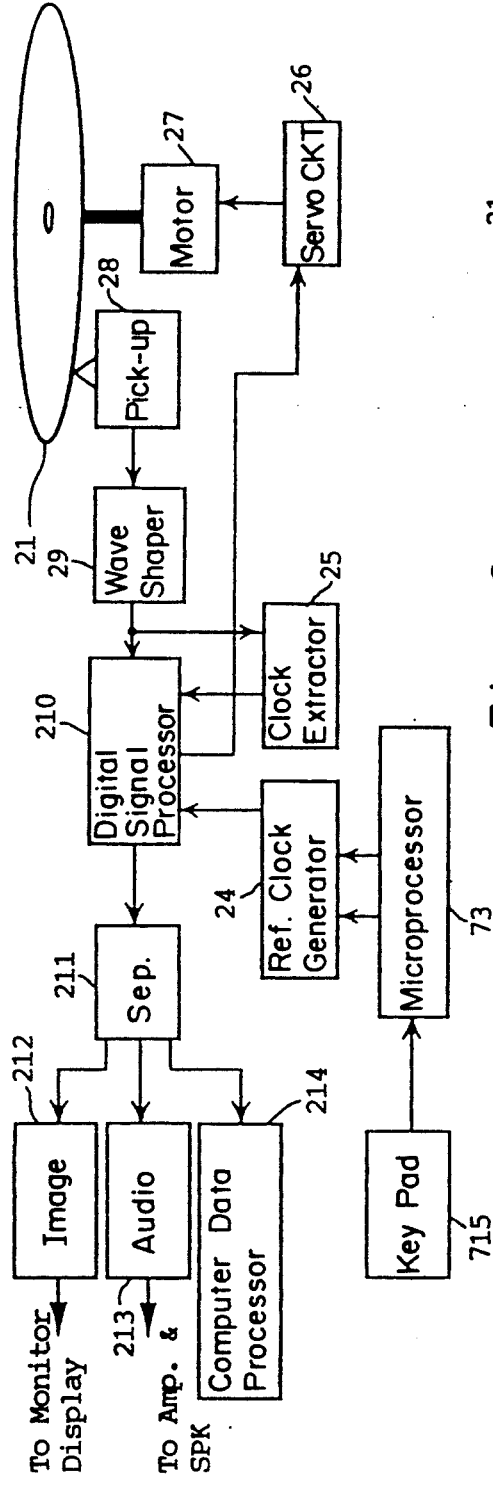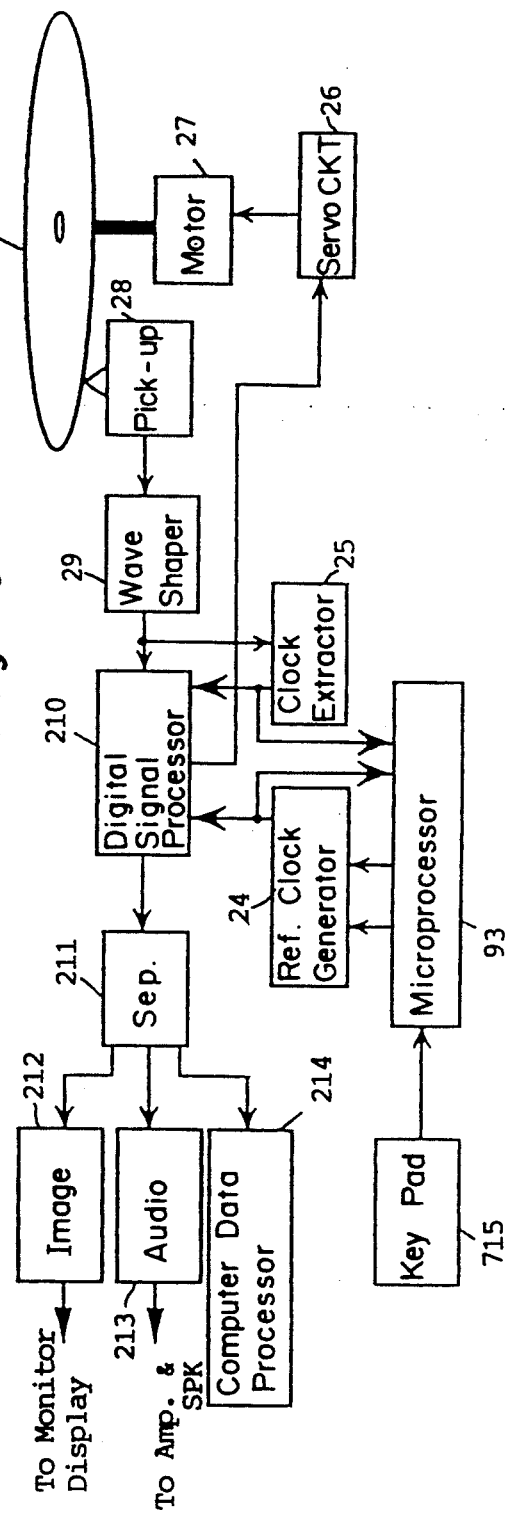

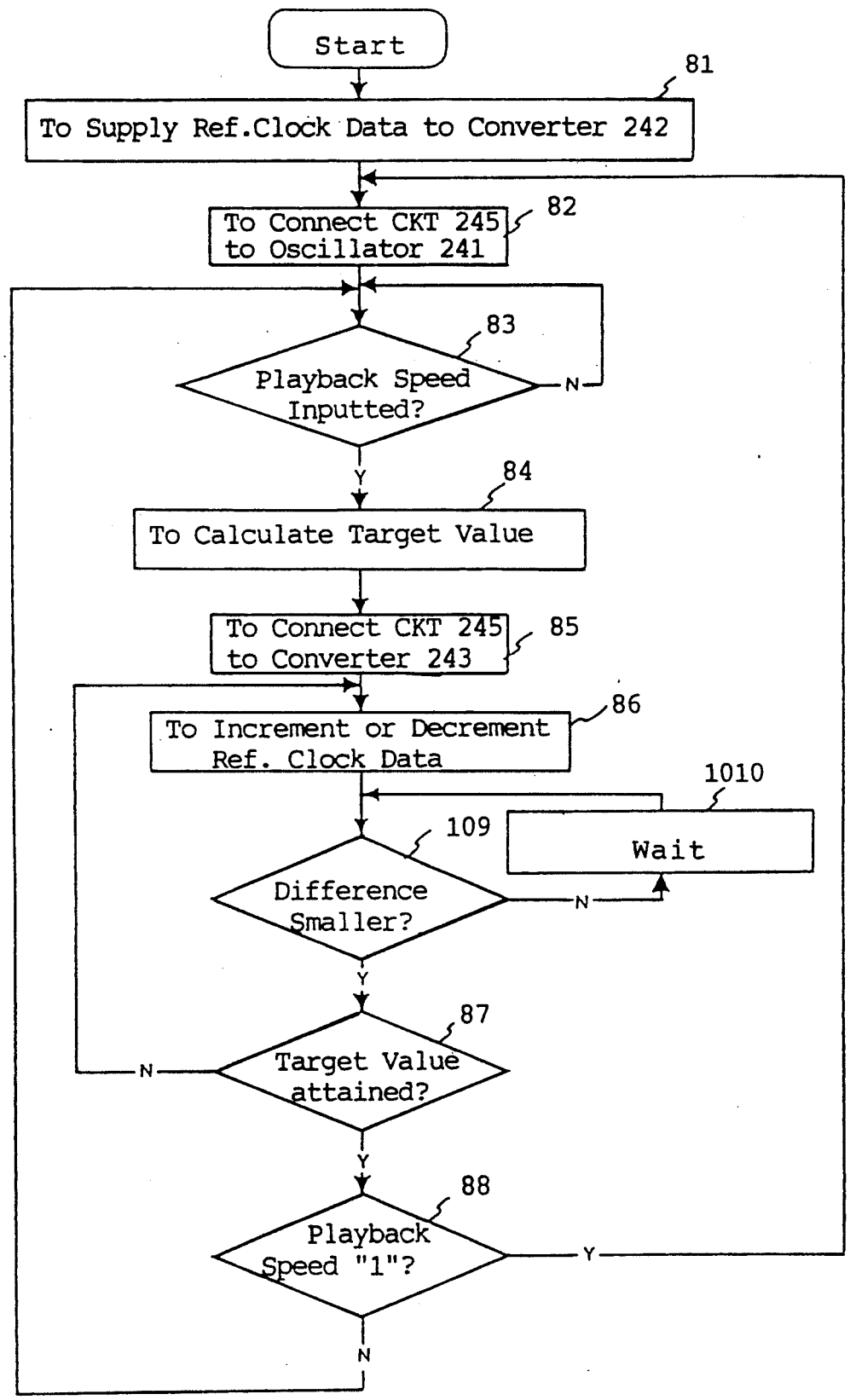

DISC PLAYBACK APPARATUS FOR REPRODUCING SEQUENTIALLY RECORDED DIGITAL DATA

BACKGROUND OF THE INVENTION

1. Field of the Invention

The present invention generally relates to an information reproducing apparatus and, more particularly, to a disc playback apparatus for reproducing information recorded on a disc having, as main data, digital data including an image data and/or a computer data, recorded sequentially thereon.

2. Description of the Prior Art

A compact disc in the form of an optical disc having audio information recorded thereon and a disc playback apparatus for reproducing the audio information on the compact disc are nowadays very popular. A recent trend is however to use the compact disc as a read-only memory having computer data and/or image data recorded thereon and, for this purpose, a compact disc interactive (CD-I) has been developed. The CD-I is generally considered audio-visual equipment of next generation which can be used for interactive multimedia presentation. The CD-I disc and the CD-I player are discussed in the book "Compact Disc-Interactive A DESIGNER'S OVERVIEW", Philips International, Inc., McGraw-Hill Book Company.

However, such a disc playback apparatus for reproducing computer data and/or image data recorded thereon has a drawback in that, unlike the conventional compact disc player, the playback speed cannot be arbitrarily chosen. While in the conventional compact disc player an accelerated reproduction is accomplished by skipping recorded data, the application of this technique to the reproduction of the computer data and/or the image data would result in a failure of the disc playback apparatus to properly reproduce the data because of some of the data having been skipped.

SUMMARY OF THE INVENTION

The present invention is intended to provide an improved disc playback apparatus effective to reproduce, at an adjustable speed (such as at a speed twice or one half of the normal reproduction speed), reproduce the data which include the image data and/or the computer data sequentially recorded on a disc, with no loss of some of the information, so as to thereby provide information significant to a person viewing the image or to a computer capable of processing the computer data.

In order to accomplish the above described object, the present invention provides a disc playback apparatus which comprises a reading means for reading data from a disc which is holding image data and/or computer data sequentially, and its data reading speed being varied under the control of a control means, a playback speed indicating means for indicating a speed at which the reproduction is carried out, a control means for controlling the reading means to permit the latter to read out the data at a playback speed indicated by the playback speed indicating means, and a processing and outputting means for processing and outputting the data outputted from the reading means.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numeral and in which:

FIG. 1 is a diagram showing a conception of a disc playback apparatus according to the present invention;

FIG. 2 is a circuit block diagram showing a disc playback apparatus according to a first preferred embodiment of the present invention;

FIG. 3 is a circuit block diagram showing a digital signal processing circuit;

FIG. 5 is a flowchart showing the sequence of operation of a microprocessor employed in the disc playback apparatus shown in FIG. 1;

FIG. 7 is a circuit block diagram showing the disc playback apparatus according to a second preferred embodiment of the present invention;

FIG. 9 is a circuit block diagram showing the disc playback apparatus according to a third preferred embodiment of the present invention;

FIG. 10 is a flowchart showing the sequence of operation of a microprocessor employed in the disc playback apparatus shown in FIG. 9;

DETAILED DESCRIPTION OF THE EMBODIMENT

Figure 4:
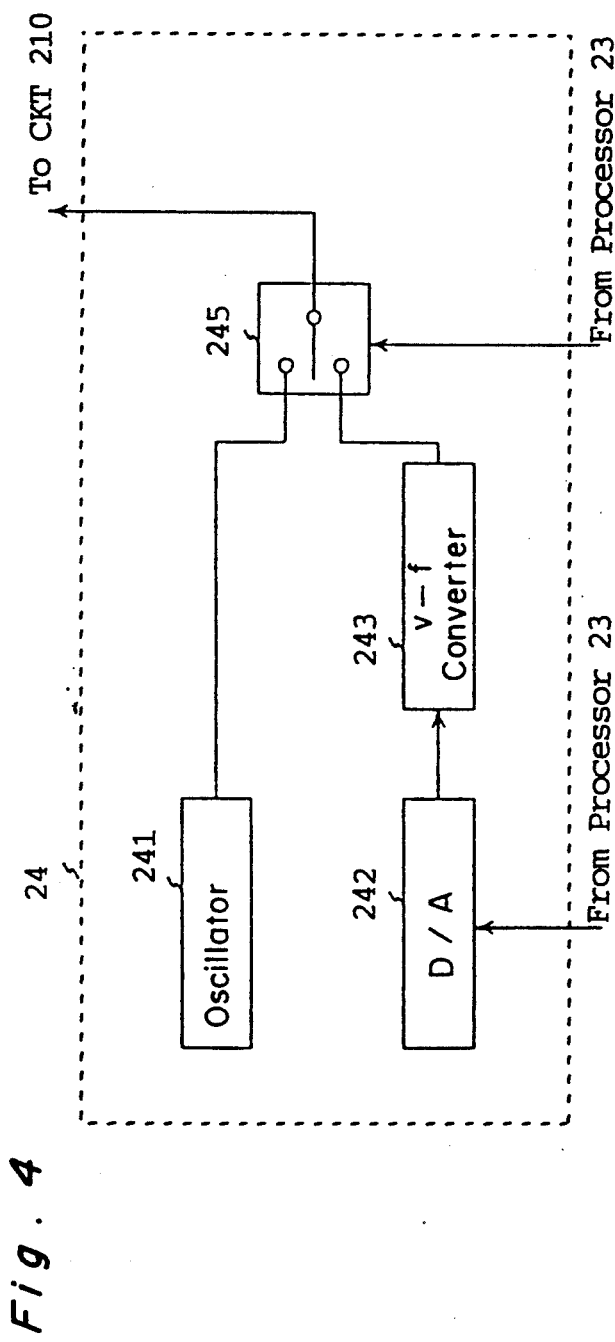
FIG. 4 is a circuit block diagram showing a reference clock generator.

In the first place, reference is made to the conceptual diagram of the disc playback apparatus according to the present invention shown in FIG. 1. In FIG. 1, reference numeral 11 represents a playback speed indicating means for indicating the speed at which information reproduction is to be effected; reference numeral 12 represents a control means for controlling a reading means 13 so that the compact disc can be reproduced at a reproducing speed indicated by the playback speed indicating means 11; and reference numeral 14 represents a processing and outputting means for receiving data outputted from the reading means 13 and for outputting the data after such data has been processed in a required manner.

The reading means 13 is operable to read data from a disc on which digital data including at least image data and/or computer data are recorded sequentially as a main data and then to output the data which are subsequently inputted to the processing and outputting means 14 so that a predetermined process is carried out subject to this data. If at this time a playback speed is instructed from an external circuit through the playback speed indicating means 11, the control means 12 controls the reading means 13 so that the disc can be reproduced at the instructed speed, and the reading means 13 varies a data reading speed according to a control of the control means 12 to read out the data from the disc. Thereafter, the processing and outputting means 14 applies the predetermined process to the data outputted from the reading means 13 and then outputs the data to an external circuit.

In this way by varying the data reading speed at which the data are read from the disc, in the event that the playback speed is instructed from the external circuit, the digital data including at least the image data and/or computer data recorded on the disc can be read out without being skipped.

Hereinafter, an example of the disc with which the disc playback apparatus of the present invention works will be described in connection with a data recording method for the CD-I.

Figure 11:
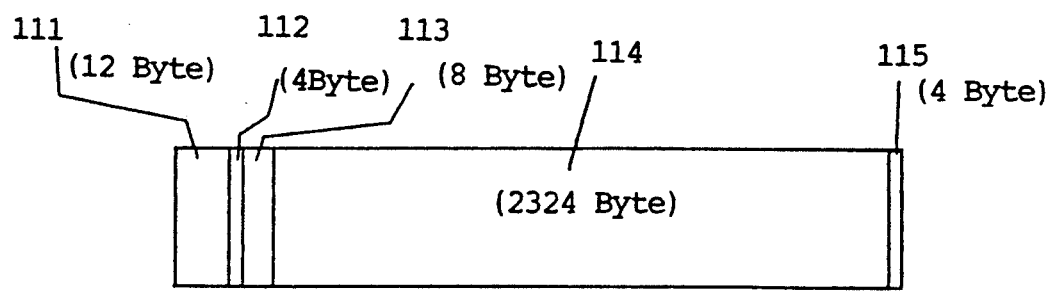
FIG. 11 is a diagram showing the format of a block.
Figure 12:
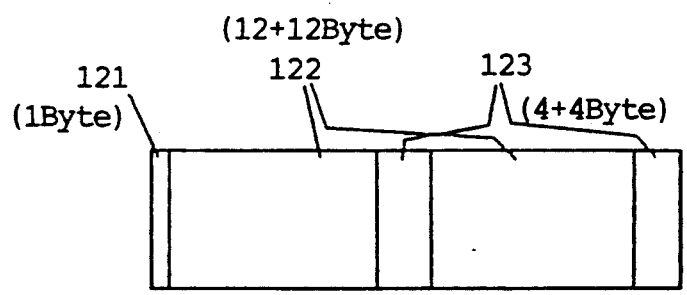
FIG. 12 is a diagram showing the format of a frame.

Referring now to FIGS. 11 and 12, there is shown the format of a block which is a minimum data access unit for the CD-I and the format of a frame which is a minimum recording unit for a compact disc, respectively.

Referring to FIG. 11, reference numeral 111 represents a block synchronizing pattern indicative of a head of each block; reference numeral 112 represents a header indicative of an address of the block; reference numeral 113 represents a sub-header indicative of an attribute of information recorded in the block; reference numeral 114 represents a user data such as image data; and reference numeral 115 represents a reserved area for a future expansion, in which area 0 is recorded. Reference numeral 121 represents a sub-code indicative of an address of the frame; and reference numeral 122 represents a user data which is the main data and in which, in the case of the compact disc, audio data are recorded. Reference numeral 123 represents an error detection and correction code used to detect and correct an error present in the user data 122.

Where the image data are to be recorded on the CD-I, the following processing takes place.

In the first place, blocks are formed. The structure of each block is shown in FIG. 11. The image data is divided every 2324 bytes and is allocated to a portion of the user data 114. Then, the block synchronizing pattern 111, the header 112 for recording addresses, the sub-header 113 in which file numbers, channel numbers, types of the recorded data are to be recorded thereon, and the reserved area 115 are added. In this way, each block is formed.

In the second place, each block is divided into a plurality of frames. The structure of each frame is shown in FIG. 12. The block is divided from the head every 12 bytes and is allocated to an area of the user data 122 as shown in FIG. 12. Then, error detection and correction codes 123 which are generally referred to CIRC (Cross Interleave Reed-Solomon Code) is added at a rate of 8 bytes for each 24 byte of the user data. Subsequently, the sub-code 121 of 1 byte is added. Thereafter, EFM (Eight to Fourteen Modulation) is carried out on the data obtained as a result of the above described processing, so as to thereby add a frame synchronizing pattern (not shown) indicative of the head of the frame. In this way, the frame is formed.

In the third place, the frames are sequentially recorded at a fixed linear speed on a spiral track formed on the CD-I disc.

The computer data are also recorded in a similar manner. However, unlike the formation of the blocks, of the total 2328 bytes allocated to the user data 114 and the reserved area 115 during the image data recording, 2048 bytes are used as a user data area for recording the computer data and the remaining 280 bytes are used as an area of the error detection and correction code for the detection and correction of an error in the user data area. The computer data block-configured in this way are divided into frames which are in turn recorded sequentially on the CD-I disc. The disc so recorded with the computer data and the image data cannot be satisfactorily reproduced at a variable speed so long as a conventional method is employed wherein some of the tracks are kicked at predetermined timings which is the case with the compact disc.

By way of example, if the track kicking is carried out during a reading of the image data from the CD-I disc, a reproduction of the image data will be interrupted and an insignificant picture having a portion dropped off will be displayed.

This is true of the case wherein the CD-I disc has computer data, such as computer programs recorded thereon. If the track kicking is carried out during a reading of a series of computer programs, a portion of the computer programs will be dropped off and the CD-I disc will be shut down.

Figure 6:
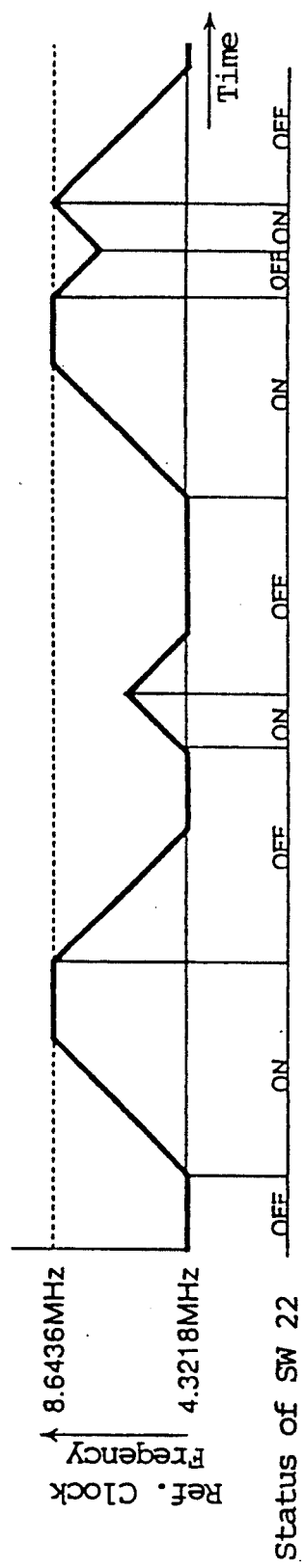
FIG. 6 is a timing chart showing a relationship between the status of a switch and the frequency of the reference clock signal.

Hereinafter, a first preferred embodiment of the present invention will be described with reference to FIGS. 2 to 6 in which FIG. 2 is a circuit block diagram showing a disc playback apparatus according to a first preferred embodiment of the present invention; FIG. 3 is a circuit block diagram showing a digital signal processing circuit; FIG. 4 is a circuit block diagram showing a reference clock generator; FIG. 5 is a flowchart showing the sequence of operation of a microprocessor employed in the disc playback apparatus shown in FIG. 1; and FIG. 6 is a timing chart showing a relationship between the status of a switch and the frequency of the reference clock signal, respectively.

In FIG. 2, reference numeral 21 represents a CD-I disc having the image data recorded thereon according to the method described in connection with the prior art; reference numeral 22 represents a switching circuit operatively associated with a fast feed button; reference numeral 23 represents a microprocessor for controlling a reference clock signal generator 24 during a length of time at which the switching circuit 22 is in an ON state; and reference numeral 24 represents the reference clock signal generator which shown in detail in FIG. 4 and which generates reference clock signals according to a control of the microprocessor 23. Reference numeral 25 represents a clock extracting circuit adapted to receive a pulse signal outputted from a wave shaping circuit 29 and to formulate clock signals necessary to latch data which is hereinafter referred to as a playback clock signal; reference numeral 26 represents a servo circuit adapted to receive the playback clock signal outputted from the clock extracting circuit 25 and the reference clock signal outputted from the reference clock generator 24 and to control a spindle motor 27; reference numeral 27 represents the spindle motor for rotating the CD-I disc 21; reference numeral 28 represents a pick-up assembly for reading data from the CD-I disc 21 by means of an optical means and for outputting an electrical signal; reference numeral 29 represents the wave shaping circuit for shaping the electrical signal outputted from the pick-up assembly 28 into a pulse signal; and reference numeral 210 represents a digital signal processing circuit, the details of which are shown in FIG. 3 and which is operable to latch the data from the pulse signal outputted from the wave shaping circuit 29 and to output the latched data after processes of synchronization detection, EFM demodulation, error detection and error correction have been performed thereon.

Reference numeral 211 represents a separating circuit adapted to receive data outputted from a digital signal processing circuit and to connect, in dependence on the data indicative of the type of information recorded in the subheader 113, to an image processing and outputting circuit 212 in the case of the image data, to an audio processing and outputting circuit 213 in the case of an audio data, and to a computer data processing circuit 214 in the case of the computer data; reference numeral 212 represents the image processing and outputting circuit adapted to receive the image data, store temporarily data corresponding to one picture and convert it into analog signal and to output such an electrical signal; reference numeral 213 represents the audio processing and outputting circuit adapted to receive an audio signal, store it temporarily and convert into an electrical signal at a predetermined timing and to output the resultant signal; and reference numeral 214 represents the computer data processing circuit adapted to receive the computer data and to perform a process according to the inputted computer data.

In FIG. 3, reference numeral 2101 represents a latch circuit for latching the data from the pulse signal outputted from the wave shaping circuit 29; reference numeral 2102 represents a synchronization detecting circuit for detecting synchronization; reference numeral 2103 represents an EFM demodulating circuit for effecting an EFM demodulation to the data whose synchronization has been detected by the synchronization detecting circuit 2102 and for outputting it; reference numeral 2104 represents a random access memory for temporarily storing the EFM demodulated data and subsequently outputting it; reference numeral 2105 represents an error detecting and correcting circuit for effecting an error detection and correction process to the data read out from the random access memory 2104 and for outputting it; and reference numeral 2106 represents a RAM reminder calculating circuit for calculating the capacity remaining in the random access memory 2104.

In FIG. 4, reference numeral 241 represents a quartz oscillator for outputting a pulse signal of 4.3218 MHz; reference numeral 242 represents a digital-to-analog converter (D/A) adapted to receive the reference clock data from the microprocessor and to convert it into a voltage signal; reference numeral 243 represents a voltage-to-frequency converter (v-f) for outputting a pulse signal of a frequency proportional to the voltage of an output signal from the digital-to-analog converter 242; and reference numeral 245 represents a reference clock selecting circuit for selecting a reference clock signal to be outputted according to instructions given from the microprocessor 23.

In FIG. 6, the abscissas axis represents time while the ordinate axis represents the frequency of the reference clock signal.

Referring to FIG. 2, the switching circuit 22 corresponds to the playback speed indicating means 11 shown in FIG. 1; a combination of the microprocessor 23 and the reference clock generating circuit 24 corresponds to the control means 12 shown in FIG. 1; a combination of the clock extracting circuit 25, the servo circuit 26, the spindle motor 27, the pick-up assembly 28, the wave shaping circuit 29 and a portion (the RAM remainder calculating circuit 2106) of the digital signal processing circuit 210 corresponds to the reading means 13 shown in FIG. 1; and a combination of the digital signal processing circuit 210, the separating circuit 211, the image processing and outputting circuit 212, the audio processing and outputting circuit 213 and the computer data processing circuit 214 corresponds to the processing and outputting means 14 shown in FIG. 1.

The disc playback apparatus of the above described construction according to the first preferred embodiment of the present invention operates in the following manner.

The spindle motor 27 drives the CD-I disc 21 in one direction according to instructions given by the servo circuit 26. The CD-I disc 21 has data recorded thereon and the pick-up assembly 28 outputs an electrical signal corresponding thereto. The analog signal outputted from the pick-up assembly 28 is converted by the wave shaping circuit 29 into a pulse signal which is subsequently inputted to the digital signal processing circuit 210 and the clock extracting circuit 25. The clock extracting circuit 25 is comprised of a phase locked loop and some other circuit components and is operable to receive the pulse signal from the wave shaping circuit 29 and to reproduce the clock signal. This reproduced clock signal is hereinafter referred to as the playback clock signal.

The playback clock signal is supplied to the digital signal processing circuit 210. The digital signal processing circuit 210 is so structured as shown in FIG. 3 and performs the following processes. At the outset, the latch circuit 2101 latches the pulse signal from the wave shaping circuit 29 on the basis of the playback clock signal supplied from the clock extracting circuit 25 thereby to permit the pulse signal to be converted into a string of binary digital data. Then, the synchronization detecting circuit 2102 detects a frame synchronized pattern from the string of binary digital data by monitoring values of the data from the latch circuit 2101 and outputs the data other than the frame synchronized pattern to the EFM demodulating circuit 2103. The EFM demodulating circuit 2103 effects an EFM demodulation to the data inputted thereto, to write it in the random access memory 2104 at a timing of the playback clock signal.

The error detecting and correcting circuit 2105 serves to read the data out from the random access memory 2104 on the basis of the reference clock signal generated from the reference clock generating circuit 24, or to effect the error detection and correction process using CIRC while writing the data in the random access memory 2104 and subsequently outputs the processed data to the separating circuit 211 at a timing based on the reference clock signal. The separating circuit 211, upon receipt of the data, examines the type of the data recorded in the user data 114 recorded in the sub-header 113 in the data and outputs an appropriate user data 114 to the image processing and outputting circuit 212 if the image data are recorded; to the audio processing and outputting circuit 213 if the audio data are recorded; and to the computer data processing circuit 214 if the computer data are recorded.

The image processing and outputting circuit 212 receives the user data 114 having the image data recorded therein, stores the image data until they comes to correspond to one picture, and, after the stored image data has come to correspond to one picture, and converts them into a signal which is subsequently outputted therefrom as an image signal. The audio processing and outputting circuit 213 receives the user data 94 having the audio data recorded therein, stores it temporarily and coverts into a signal at a predetermined timing, which is subsequently outputted therefrom as an audio signal. On the other hand, the computer data processing circuit 214 receives the user data 94 having the computer data recorded therein, interprets the contents of the computer data and performs a process according to the interpreted contents of the computer data.

The RAM reminder calculating circuit 2106 included in the digital signal processing circuit 210 plays a role of controlling the rotation of the spindle motor 21 for avoiding an overflow or underflow of the random access memory 2104. In other words, the RAM reminder calculating circuit 2106 counts the number of data bits written by the EFM demodulating circuit 2103 into the random access memory 2104 and also the number of data bits read by the error detecting and correcting circuit 2105 out of the random access memory 2104, and compares them to determine the capacity of the data stored in the random access memory 2104 and instructs the servo circuit 26 either to reduce the rotational speed of the spindle motor 27 when the capacity of the data stored in the random access memory 2104 exceeds a predetermined value or to increase the rotational speed of the spindle motor 27 when the capacity of the data stored in the random access memory 2104 is lowered below the predetermined value. In this way, it is possible to keep the random access memory 2104 out of an overflow or underflow condition.

The control of the rotational speed of the spindle motor 27 effected in the manner described above is equivalent to a control in which the speed at which the data are written in the random access memory 2104, that is, the frequency of the playback clock signal, is matched with the speed at which the data are read out from the random access memory 2104, that is, the frequency of the reference clock signal, and therefore, it may be said that the RAM reminder calculating circuit 2106 controls the spindle motor 27 so that the frequency of the playback clock signal can be matched with the frequency of the reference clock signal.

The microprocessor 23 controls the reference clock generating circuit 24 in dependence on the status of the switching circuit 22 to vary the frequency of the reference clock signal. To describe the switching circuit 22, the reference clock generating circuit 24 includes the quartz oscillator 241 capable of oscillating at a frequency of 4.3218 MHz, digital-to-analog converter 242, voltage-to-frequency converter 243, and playback clock selecting circuit 245 for selecting and outputting one of the output from the quartz oscillator 241 and the output from the voltage-to-frequency converter 243. The digital-to-analog converter 242 converts the reference clock data from the microprocessor 23 into a voltage value which is subsequently fed to the voltage-to-frequency converter 243. The voltage-to-frequency converter 243 is so designed as to generate a pulse signal of a frequency proportional to the voltage outputted from the digital-to-analog converter 242. Accordingly, the reference clock signal of any desired frequency can be formulated according to instructions given by the microprocessor 23. It is to be noted that the frequency of 4.3218 MHz at which the quartz oscillator 241 oscillates is equal to the frequency of the reference clock signal used in a phase-locked loop circuit for the clock reproduction employed in the conventional CD-I disc player and, by selecting the frequency of the reference clock signal to be of this value, the optical disc playback apparatus can reproduce the CD-I disc 21 at the same speed as in the conventional compact disc interactive player.

The microprocessor 23 performs the processes shown in FIG. 5. Subsequent to the start of the flow of FIG. 5, and at an initializing step 50, the reference clock data is supplied to the digital-to-analog converter 242 so that the voltage-to-frequency converter 243 can generate the pulse signal of 4.3218 MHz and, at step 51, the playback clock selecting circuit 245 is set in position to connect to the quartz oscillator 241. Then, at step 52 the status of the switching circuit 22 is monitored until the switching circuit 22 is switched on and, if the switching circuit 22 is switched on, the playback clock selecting circuit 245 is set in position to connect to the voltage-to-frequency converter at step 53. Then, at step 54 the reference clock data of the reference clock signal is incremented, followed by a decision step 55 to determine if the reference clock data attains a value higher than a predetermined value. If the reference clock data attains the value higher than the predetermined value, the program flow goes to step 56, but if it has not yet attained the value higher than the predetermined value, the program flow goes to step 57. The predetermined value referred to above is a value at which the frequency of the pulse signal generated from the voltage-to-frequency converter 243 reaches 8.6436 MHz and is fixed in dependence on characteristics of the voltage-to-frequency converter 243.

When the value of the reference clock data exceeds the predetermined value and, accordingly, the program flow goes to step 56, the status of the switching circuit 22 is monitored and, if the switching circuit 22 is switched on, the monitoring continues, but if the switching circuit 22 is switched off, the program flow goes to step 58. Also, even when the value of the reference clock data is lower than the predetermined value and, accordingly, the program flow goes to step 57, the status of the switching circuit 22 is monitored and, if it is switched on, the value of the reference clock data is incremented, but if it is switched off, the program flow goes to step 58. At step 58, the value of the reference clock data is decremented, followed by a step 59 at which a decision is made to determine if the value of the reference clock data has assumed the initial value, that is, if the frequency of the pulse signal generated by the voltage-to-frequency converter 243 attains a value of 4.3218 MHz. If the value of the reference clock data has assumed the initial value, the program flow returns to step 51 to repeat the process. On the other hand, if the value of the reference clock data has not assumed the initial value yet, the program flow returns to step 57 at which a decision is made to determine if the switching circuit 22 is switched on. If the decision at step 57 indicates that the switching circuit 22 has been switched on, the reference clock data is increased, but if it does not indicate that the switching circuit 22 has been switched on, the reference clock data is decremented. A change in frequency of the reference clock signal is shown in the graph of FIG. 6.

Since as hereinbefore described the RAM reminder calculating circuit 2106 included in the digital signal processing circuit 210 serves to control the spindle motor 27 so that the frequency of the playback clock signal can match with the frequency of the reference clock signal, an increase of the frequency of the reference clock signal makes it possible to increase a transfer rate of the frequency of the playback clock signal, that is, the data reproduced from the CD-I disc 21. Also, by varying the frequency of the reference clock signal continuously as hereinbefore described, it is possible to continuously vary the transfer rate of the data reproduced from the CD-I disc 21 and, therefore, with no data drop-out being accompanied, the transfer rate of the reproduced data can be adjusted.

According to the foregoing embodiment of the present invention, the provision of the reference clock generating circuit 24 capable of varying the frequency of the reference clock signal according to the instructions from the microprocessor 23, the switching circuit 22 adapted to receive a playback speed change command, used to change the playback speed, from the external circuit, the microprocessor 223 for controlling the reference clock generating circuit 24 in response to the external playback speed change command and the RAM remainder calculating circuit 2106 for controlling the rotational speed of the spindle motor 24 so that the frequency of the playback clock signal can be matched with the frequency of the reference clock signal makes it possible to vary the playback speed with no data drop-out being accompanied in the event that the disc on which the digital data including at least the image data and/or computer data as the main data is desired to be reproduced.

It is to be noted that, in describing the foregoing embodiment of the present invention, reference has been made to the use of two clock generating circuits, i.e., the quartz oscillator 241 and the voltage-to-frequency converter 243, in the reference clock generating circuit 24. This is because the quartz oscillator is generally capable of providing the signal of more consistent frequency than that generated by the voltage-to-frequency converter. In the practice of the foregoing embodiment of the present invention, the quartz oscillator 241, which is capable of generating a clock signal of consistent frequency, is utilized during a normal speed playback, but the voltage-to-frequency converter 243, whose frequency can readily be adjusted, is utilized during a varied speed playback, i.e., the playback effected at a speed different from the normal playback speed. However, the reference clock generating circuit 24 may be comprised of only the voltage-to-frequency converter 243.

Figure 8:
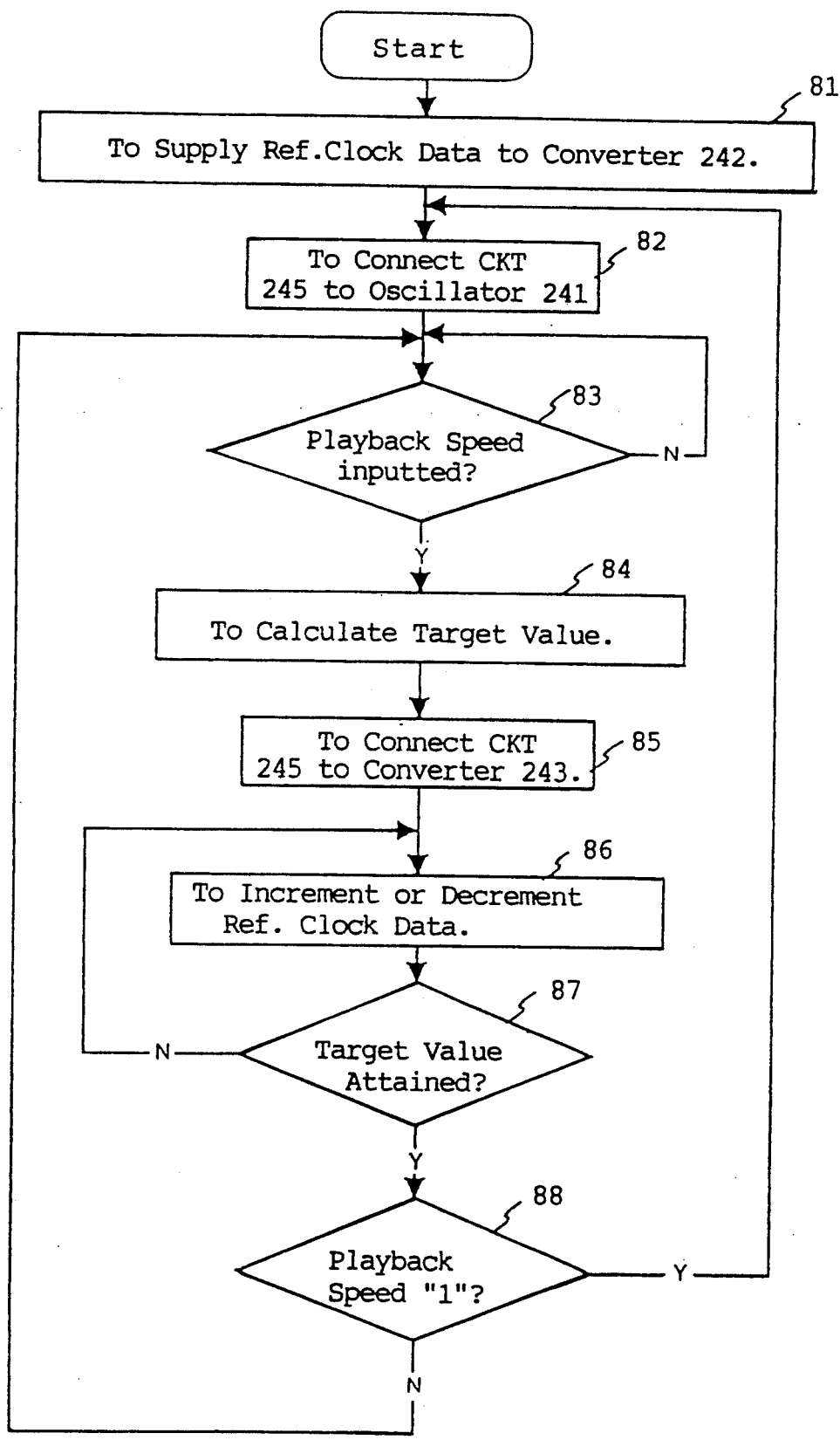
FIG. 8 is a flowchart showing the sequence of operation of a microprocessor employed in the disc playback apparatus shown in FIG. 7.

A second preferred embodiment of the present invention is shown in FIGS. 4, 7 and 8, reference to which will now be made.

FIG. 4 is a circuit block diagram showing a reference clock generating circuit 24 which is identical with that described in connection with the foregoing embodiment of the present invention. FIG. 7 is a circuit block diagram showing the disc playback apparatus according to the second preferred embodiment of the present invention, and FIG. 8 is a flowchart showing the sequence of operation of a microprocessor employed in the disc playback apparatus shown in FIG. 7. It is to be noted that the circuit components identified respectively by 21, 24, 25, 26, 27, 28, 29, 210, 211, 212, 213 and 214 in FIG. 7 are identical with those shown and described in connection with the foregoing embodiment of the present invention. Reference numeral 715 represents a ten key pad from which one or more numerals indicative of the desired playback speed can be inputted; and reference numeral 73 represents a microprocessor for controlling the reference clock generating circuit 24 so that the CD-I disc 21 can be reproduced at the playback speed determined by an output from the ten key pad 715.

Referring to FIG. 7, the ten key pad 15 corresponds to the playback speed indicating means 11 shown in FIG. 1; the microprocessor 73 and the reference clock generating circuit correspond to the control means 12 shown in FIG. 1; the clock extracting circuit 25, the servo circuit 26, the spindle motor 27, the pick-up assembly 28, the wave shaping circuit 29 and a portion (RAM reminder calculating circuit 2106) of the digital signal processing circuit 210 correspond to the reading means 13 shown in FIG. 1; and the digital signal processing circuit 210, the separating circuit 211, the image processing and outputting circuit 212, the audio processing and outputting circuit 213 and the computer data processing circuit 214 correspond to the processing and outputting means 14 shown in FIG. 1.

The disc playback apparatus so constructed as hereinabove described according to the second embodiment of the present invention operates in the following manner.

The spindle motor 27, the servo circuit 26, the pick-up assembly 28, the wave shaping circuit 29, the digital signal processing circuit 210 and the clock extracting circuit 25 operate to read the data out from the CD-I disc 21, to extract the playback clock signal, to detect the synchronism with the frame, to effect EFM demodulation and to detect and correct the error as in the first embodiment of the present invention. Also, a control of the rotational speed of the spindle motor 27 is also made to render the frequency of the playback clock signal to match with the frequency of the reference clock signal. The data outputted from the digital signal processing circuit 210 is inputted to the separating circuit 211 which is subsequently processed by and outputted from the image processing and outputting circuit 212, the audio processing and outputting circuit 213 or the computer data processing circuit 214 in a manner identical with that in the foregoing embodiment of the present invention.

The ten key pad 15 is used to input the playback speed from the external circuit to the microprocessor 73. The playback speed is expressed by "1" in the case of the normal playback speed and, if the playback speed is expressed by "0.5" and "2", it means that the playback is effected at a speed one half of the normal playback speed (i.e., at a slow playback speed) and at a speed twice the normal playback speed (i.e., at a fast playback speed), respectively.

The microprocessor 73 executes the program shown in FIG. 8. Subsequent to the start of the flow of FIG. 8, and at an initializing step 81, the reference clock data is supplied to the digital-to-analog converter 242 (FIG. 4) so that the voltage-to-frequency converter 243 (FIG. 4) can generate the pulse signal of 4.3218 MHz and, at step 82, the playback clock selecting circuit 245 (FIG. 4) is set in position to connect to the quartz oscillator 241 (FIG. 4). Then, at step 83, a decision is made to determine if the playback speed is inputted to the ten key pad 715 and, if it is not inputted, this decision step 83 is repeated until the playback speed is inputted to the ten key pad 715. Should the playback speed be inputted, a target value is calculated for the reference clock data utilizing the playback speed inputted from the ten key pad 715 at step 84. The target value may be determined depending on the playback speed and characteristics of the voltage-to-frequency converter 243 included in the reference clock generating circuit 24. After the calculation of the target value, the reference clock selecting circuit 245 (FIG. 4) is set in position to connect to the voltage-to-frequency converter 243 (FIG. 4) at step 85 and the reference clock data is incremented at step 86 or decremented at step 87 until the reference clock data coincides with the target value. Once the reference clock data coincides with the target value, another decision is made at step 88 to determine if the playback speed inputted at step 83 is "1". If the playback speed inputted at step 83 is "1", the program flow returns to step 82, followed by the setting of the reference clock selecting circuit 245 (FIG. 4) in position to connect to the quarts oscillator 241 (FIG. 4) and a wait is made until the playback speed is inputted to the ten key pad 715. On the other hand, if the playback speed inputted at step 83 is not "1", the program flow returns to step 83 and the reference clock selecting circuit 245 (FIG. 4) is then set in position to connect to the voltage-to-frequency converter 243 (FIG. 4) and a wait is made until the playback speed is inputted to the ten key pad 715.

As is the case with the first preferred embodiment of the present invention, since the RAM reminder calculating circuit 2106 included in the digital signal processing circuit 210 serves to control the spindle motor 27 so that the frequency of the playback clock signal can match with the frequency of the reference clock signal, an increment of the value of the reference clock data or a decrement of the frequency of the reference clock signal makes it possible to increase or decrease the transfer rate of the data to be reproduced from the CD-I disc 21. Also, since the provision is made of an input device such as the ten key pad 715 through which numeric values can be inputted so that the playback speed can be inputted in the form of numerals, the apparatus can respond to any demand concerning the playback speed.

According to the foregoing second preferred embodiment of the present invention, the provision of the reference clock generating circuit 24 capable of varying the frequency of the reference clock signal according to the instructions from the microprocessor 23, the input device such as the ten key pad 715 through which numerals can be inputted, the microprocessor 223 for controlling the reference clock generating circuit 24 in response to the external playback speed specified by an external circuit and the RAM remainder calculating circuit 2106 for controlling the number of revolutions of the spindle motor 24 so that the frequency of the playback clock signal can be matched with the frequency of the reference clock signal makes it possible to vary the transfer rate of the data read from the CD-I disc 21 according to the playback speed specified by the external circuit with no accompanying data drop-out, and also, since the playback speed can be specified in terms of numeric values, the disc playback apparatus having a relatively wide freedom in which the user can specify any desired playback speed can be realized.

With reference to FIGS. 4, 9 and 10, a third preferred embodiment of the present invention will now be described.

FIG. 4 is a circuit block diagram showing the reference clock generating circuit which has been described in connection with the first preferred embodiment of the present invention. FIG. 9 is a circuit block diagram showing the disc playback apparatus according to the third preferred embodiment of the present invention, and FIG. 10 is a flowchart showing the sequence of operation of the microprocessor employed in the disc playback apparatus according to the third preferred embodiment of the present invention.

In FIG. 9, the component parts identified respectively by 24 to 214 and 715 are identical with those described in connection with the second preferred embodiment of the present invention. Reference numeral 93 represents a microprocessor having two counting circuits built therein.

It is to be noted that the ten key pad 715 shown in FIG. 9 corresponds to the playback speed indicating means 11 shown in FIG. 1; the microprocessor 93 and the reference clock generating circuit 24 shown in FIG. 9 correspond to the control means 12 shown in FIG. 1; the clock extracting circuit 25, the servo circuit 26, the spindle motor 27, the pick-up assembly 28, the wave shaping circuit 29 and a portion (RAM remainder calculating circuit 2106) of the digital signal processing circuit 210 all shown in FIG. 9 correspond to the reading means 13 shown in FIG. 1; and the digital signal processing circuit 210, the separating circuit 211, the image processing and outputting circuit 212, the audio processing and outputting circuit 213 and the computer data processing circuit 214 all shown in FIG. 9 correspond to the processing and outputting means 14 shown in FIG. 1.

The disc playback apparatus so constructed as hereinabove described according to the third embodiment of the present invention operates in the following manner.

The spindle motor 27, the servo circuit 26, the pick-up assembly 28, the wave shaping circuit 29, the digital signal processing circuit 210 and the clock extracting circuit 25 operate to read the data out from the CD-I disc 21, to extract the playback clock signal, to detect the synchronization with the frame, to effect EFM demodulation and to detect and correct the error as in the second embodiment of the present invention. Also, a control of the rotational speed of the spindle motor 27 is also made to render the frequency of the playback clock signal to match with the frequency of the reference clock signal. The data outputted from the digital signal processing circuit 210 is inputted to the separating circuit 211 which is subsequently processed by and outputted from the image processing and outputting circuit 212, the audio processing and outputting circuit 213 or the computer data processing circuit 214 in a manner identical with that in the first embodiment of the present invention. The ten key pad 715 is utilized in a manner similar to that in the second embodiment of the present invention to input the playback speed from the external circuit to the microprocessor 93.

The microprocessor 93 makes use of the two counting circuits to measure the frequency of the reference clock signal and that of the playback clock signal and performs the process as shown in FIG. 10 by the utilization of the playback speed inputted from the ten key pad 715 and the respective frequencies of the reference clock and playback clock signals. The frequency measurement is carried out by counting the number of clocks during a predetermined length of time using a counter, or by measuring the length of time required for the value of the counter to attain a predetermined value.

Referring to FIG. 10, subsequent to the start of the flow of FIG. 10, and at an initializing step 81, the reference clock data is supplied to the digital-to-analog converter 242 (FIG. 4) so that the voltage-to-frequency converter 243 (FIG. 4) can generate the pulse signal of 4.3218 MHz and, at step 82, the playback clock selecting circuit 245 (FIG. 4) is set in position to connect to the quartz oscillator 241 (FIG. 4). Then, at step 83, a decision is made to determine if the playback speed is inputted to the ten key pad 715 and, if it is not inputted, this decision step 83 is repeated until the playback speed is inputted to the ten key pad 715. Should the playback speed be inputted, a target value is calculated for the reference clock data utilizing the playback speed inputted from the ten key pad 715 at step 84. The target value may be determined depending on the playback speed and characteristics of the voltage-to-frequency converter 243 included in the reference clock generating circuit 24. After the calculation of the target value, the reference clock selecting circuit 245 (FIG. 4) is set in position to connect to the voltage-to-frequency converter 243 (FIG. 4) at step 85 and the reference clock data is incremented or decremented at step 86 until the reference clock data coincides with the target value. Then at step 109 a decision is made to determine if the absolute value of a difference between the frequencies of the reference and playback clock signals is smaller than a predetermined value and, if it is greater than the predetermined value, a wait is made for a predetermined length of time at step 1010 until the frequency of the playback clock signal approaches the frequency of the reference clock signal. In other words, the steps 109 and 1010 are repeated before the absolute value of the difference between the frequencies of the reference clock signal and the playback clock signal attains a value smaller than the predetermined value. If the result of decision at step 109 indicates that the absolute value is smaller than the predetermined value, another decision step 87 is carried out to determine if the reference clock data coincides with the target value. The predetermined value referred to above is a numerical value by which it can be determined that the control of the rotational speed of the spindle motor 27 is released and is determined depending on characteristics of a rotational control loop determined depending on respective characteristics of the motor 27, the servo circuit 26, the digital signal processing circuit 210 and the clock extracting circuit 25. Then, at step 87 a decision is made to determine if the reference clock data coincide with the target value and, if it has not yet coincided with the target value, a routine at step 86 is executed to increment or decrement the reference clock data so that it can coincide with the target value. If the reference clock data has coincided with the target value, a decision is made at step 88 to determine if the playback speed inputted at step 83 is "1" and, if a result of decision at step 88 indicates that the inputted playback speed is "1", the program flow returns to step 82 so that the reference clock selecting circuit 245 (FIG. 4) can be brought in position to connect to the quartz oscillator 241 (FIG. 4) in readiness for the playback speed to be inputted to the ten key pad 715. On the other hand, if the result of decision at step 88 indicates that the inputted playback speed is not "1", the program flow returns to step 83 so that the reference clock selecting circuit 245 (FIG. 4) is allowed to remain in position to connect to the voltage-frequency converter 243 (FIG. 4) in readiness for the playback speed to be inputted to the ten key pad 715.

As is the case with the first preferred embodiment of the present invention, since the RAM reminder calculating circuit 2106 included in the digital signal processing circuit 210 serves to control the spindle motor 27 so that the frequency of the playback clock signal can match with the frequency of the reference clock signal, an increment or decrement of the value of the reference clock data to vary the frequency of the reference clock signal makes it possible to increase or decrease the transfer rate of the data to be reproduced from the CD-I disc 21.

According to the foregoing third preferred embodiment of the present invention, the provision of the reference clock generating circuit 24 capable of varying the frequency of the reference clock signal according to the instructions from the microprocessor 23, the input device such as the ten key pad 715 through which numerals can be inputted, a circuit such as a counter for measuring the respective frequencies of the reference clock signal and the playback clock signal, the microprocessor 23 for controlling the reference clock generating circuit 24 in response to the external playback speed specified by an external circuit and the RAM remainder calculating circuit 2106 for controlling the number of revolutions of the spindle motor 24 so that the frequency of the playback clock signal can be matched with the frequency of the reference clock signal makes it possible to vary the transfer rate of the data read from the CD-I disc 21 according to the playback speed specified by the external circuit with no need to release the rotational control of the spindle motor 27 and with no accompanying data drop-out, and also, since the playback speed can be specified in terms of numeric values, the disc playback apparatus having a relatively wide freedom in which the user can specify any desired playback speed can be realized.

Although the present invention has been described in connection with the preferred embodiments thereof with reference to the accompanying drawings, it is to be noted that numerous changes and modifications are apparent to those skilled in the art. For example, although reference has been made to the use of the CD-I disc, the playback apparatus according to the present invention can satisfactorily operate with any one of other compact discs such as, for example, a CD-ROM (compact disc read-only memory) or an LD-ROM (laser disc read-only memory), provided that the digital data are sequentially recorded.

Also, so far as the first and second embodiments of the present invention are concerned, although the operation associated with the fast feed has been described, the playback speed can be chosen as desired. By way of example, in the case of the first preferred embodiment of the present invention, the switching circuit 22 may be in the form of a switch associated with a slow playback button operable when the reproduction is desired at a speed one half the normal playback speed or a 3-time fast playback button operable when the reproduction is desired at a speed three times the normal playback speed. In such case, assuming that the frequency of the reference clock signal generated from the reference clock generating circuit 24 when the switch associated with the 3-time fast playback button is switched on is 12.9654 MHz, the speed at which the data are read out from the CD-I disc 21 will be three times that attained when the switching circuit 22 is off (i.e., $12.9654 \div 4.3218 = 3$). On the other hand, assuming that the frequency of the reference clock signal generated from the reference clock generating circuit 24 when the switch associated with the slow playback speed is switched on is 2.1609 MHz, the speed at which the data are read from the CD-I disc 21 will be 0.5 time that attained when the switching circuit 22 is switched off (i.e., $2.1609 \div 4.3218 = 0.5$). Also, in the second embodiment of the present invention, if a coefficient of the frequency converting circuit 415 will be 0.25 when a switch associated with a 4-time fast playback button or a switch associated with a slow playback speed of a type operable when the reproduction is desired at a speed one half the normal playback speed may be provided so that, when the switch associated with the 4-time fast playback button is switched on, the speed at which the data are read out from the CD-I disc 21 will be four times that attained when the switching circuit 22 is switched off (i.e., 1÷0.25=4). On the other hand, if the coefficient of the frequency converting circuit 415 will be 2 when the switch associated with the slow playback button is switched on, the data reading speed at which the data are read from the CD-I disc 21 will be 0.5 times that attained when the switching circuit 22 is switched off (i.e., 1÷2=0.5).

Accordingly, such changes and modifications are to be understood as included within the scope of the present invention as defined by the appended claims, unless they depart therefrom.

What is claimed is:

1. A disc playback apparatus for reproducing data from a disc having recorded sequentially thereon digital data including at least image data or computer data as a main data, which comprises:

a single motor operable to rotate the disc;

a pick-up assembly operable to read the data from the disc and to output an electrical signal corresponding thereto;

a wave shaping means for shaping the electrical signal output from the pick-up assembly into a pulse signal and for outputting the pulse signal;

a clock extracting means for receiving the pulse signal from the wave shaping means and for extracting a playback clock signal from the pulse signal;

a reference clock generating means for outputting a reference clock signal and a reference clock signal control means for continuously varying a frequency of the reference clock signal;

a switching means adapted to be externally switched on and off;

wherein said reference clock control means controls the reference clock generating means so that the frequency of the reference clock signal is increased when the switching means is switched on, but is decreased when the switching means is switched off;

a rotation servo means for controlling the spindle motor so that the frequency of the playback clock signal outputted from the clock extracting means is consistent with the frequency of the reference clock signal outputted from the reference clock generating means;

a digital signal processing means for receiving the pulse signal outputted from the wave shaping means, the playback clock signal outputted from the clock extracting means and the reference clock signal outputted from the reference clock generating means and for latching data from the pulse signal on the basis of the playback clock signal, and for subjecting the latched data to a first process and to output the data after being processed by the first process, according to the reference clock signal; and a processing and outputting means for receiving data outputted from the digital signal processing means and for subjecting the data attributes to a second process and then to output the data after being processed by the second process.

2. The disc playback apparatus as claimed in claim 1, wherein the reference clock generating means comprises a quartz oscillator, a digital-to-analog converter and a voltage-to-frequency converter, and wherein said reference clock control means selects a clock signal generated by the quartz oscillator as the reference clock signal during a normal playback, but selects a clock signal generated by the voltage-to-frequency converter as the reference clock signal during a varied speed playback.

3. A disc playback apparatus for reproducing data from a disc having recorded sequentially thereon digital data including at least image data or computer data as a main data, which comprises:

a spindle motor operable to rotate the disc;

a pick-up assembly operable to read the data from the disc and to output an electrical signal corresponding thereto a wave shaping means for shaping the electrical signal output from the pick-up assembly into a pulse signal and for outputting the pulse signal;

a clock extracting means for receiving the pulse signal outputted from the wave shaping means and for extracting a playback clock signal from the pulse signal;

a reference clock generating means for outputting a reference clock signal and a reference clock signal control means for continuously varying a frequency of the reference clock signal;

a speed input means for externally inputting speed data in the form of a numerical value and then outputting such speed data;

wherein said reference clock control means controls the reference clock generating means so as to increase the frequency of the reference clock signal if a required playback speed is faster than a current playback speed and to decrease the frequency of the reference clock signal if the required playback speed is lower than the current playback speed, in accordance with the speed data outputted from the speed input means;

a rotation servo means for controlling the spindle motor so that the frequency of the playback clock signal outputted from the clock extracting means is consistent with the frequency of the reference clock signal outputted from the reference clock generating means;

a digital signal processing means for receiving the pulse signal outputted from the wave shaping means, the playback clock signal outputted from the clock extracting means and the reference clock signal outputted from the reference clock generating means and for latching data from the pulse signal on the basis of the playback clock signal, and for subjecting the latched data to a first process and to output the data after being processed by the first process, according to the reference clock signal; and a processing and outputting means for receiving data outputted from the digital signal processing means and for subjecting the data attributes to a second process and then to output the data after being processed by the second process.

4. The disc playback apparatus as claimed in claim 3, wherein the reference clock generating means comprises a quartz oscillator, a digital-to-analog converter and a voltage-to-frequency converter, and wherein said reference clock control means selects a clock signal generated by the quartz oscillator as the reference clock signal during a normal playback, but selects a clock signal generated by the voltage-to-frequency converter as the reference clock signal during a varied speed playback.

5. A disc playback apparatus for reproducing data from a disc having recorded sequentially thereon digital data including at least image data or computer data as a main data, which comprises:

a spindle motor operable to rotate the disc;
 a pick-up assembly operable to read the data from the disc and to output an electrical signal corresponding thereto;
 a wave shaping means for shaping the electrical signal output from the pick-up assembly into a pulse signal and for outputting the pulse signal;
 a clock extracting means for receiving the pulse signal outputted from the wave shaping means and for extracting a playback clock signal from the pulse signal;
 a reference clock generating means for outputting a reference clock signal and a reference clock signal control means for continuously varying a frequency of the reference clock signal;
 a speed input means for externally inputting speed data in the form of numerical value then outputting such speed data;
 wherein said reference clock control means controls the reference clock generating means so as to increase the frequency of the reference clock signal if a required playback speed is faster than a current playback speed and to decrease the frequency of the reference clock signal if the required playback speed is lower than the current playback speed, in accordance with speed data outputted from the speed input means and for also monitoring the absolute value of a difference between the respective frequencies of the reference and playback clock signals so as to thereby prevent the absolute value from exceeding a predetermined value;
 a rotation servo means for controlling the spindle motor so that the frequency of the playback clock signal outputted from the clock extracting means is consistent with the frequency of the reference clock signal outputted from the reference clock generating means;
 a digital signal processing means for receiving the pulse signal outputted from the wave shaping means, the playback clock signal outputted from the clock extracting means and the reference clock signal outputted from the reference clock generating means for latching data from the pulse signal on the basis of the playback clock signal, and for subjecting the latched data to a first process and to output the data after being processed by the first process, according to the reference clock signal; and
 a processing and outputting means for receiving data outputted from the digital signal processing means and for subjecting the data attributes to a second process and then to output the data after being processed by the second process.

6. The disc playback apparatus as claimed in claim 5, wherein the reference clock generating means comprises a quartz oscillator, a digital-to-analog converter and a voltage-to-frequency converter, and wherein said reference clock control means selects a clock signal generated by the quartz oscillator as the reference clock signal during a normal playback, but selects a clock signal generated by the voltage-to-frequency converter as the reference clock signal during a varied speed playback.

* * * * *